No. 607,505. Patented July 19, 1898.
D. CROWTHER.
MACHINE EMPLOYED IN BRAZING.
(Application filed Dec. 20, 1897.)
(No Model.) 3 Sheets—Sheet 1.
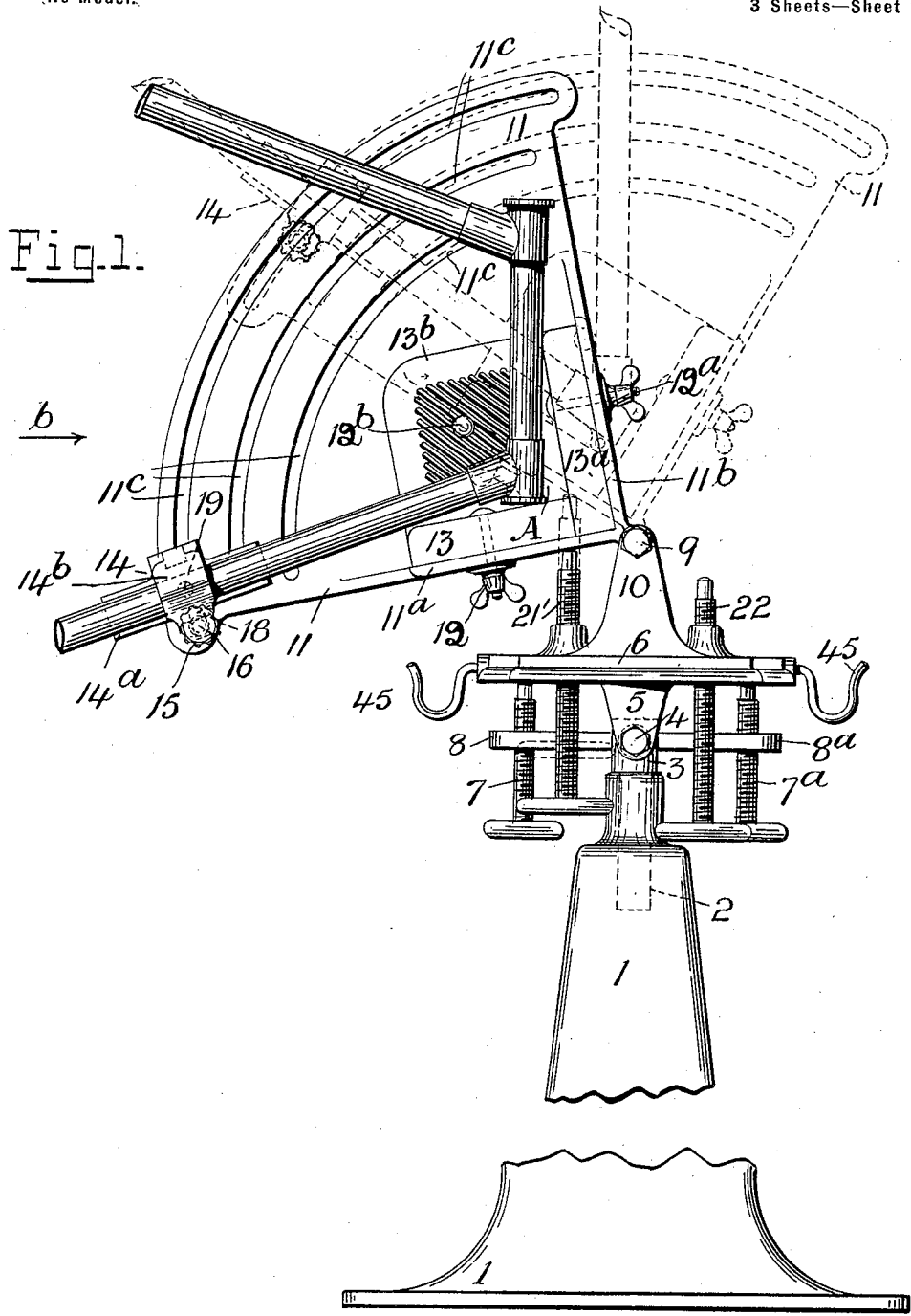

No. 607,505. Patented July 19, 1898.
D. CROWTHER.
MACHINE EMPLOYED IN BRAZING.
(Application filed Dec. 20, 1897.)
(No Model.) 3 Sheets—Sheet 2.
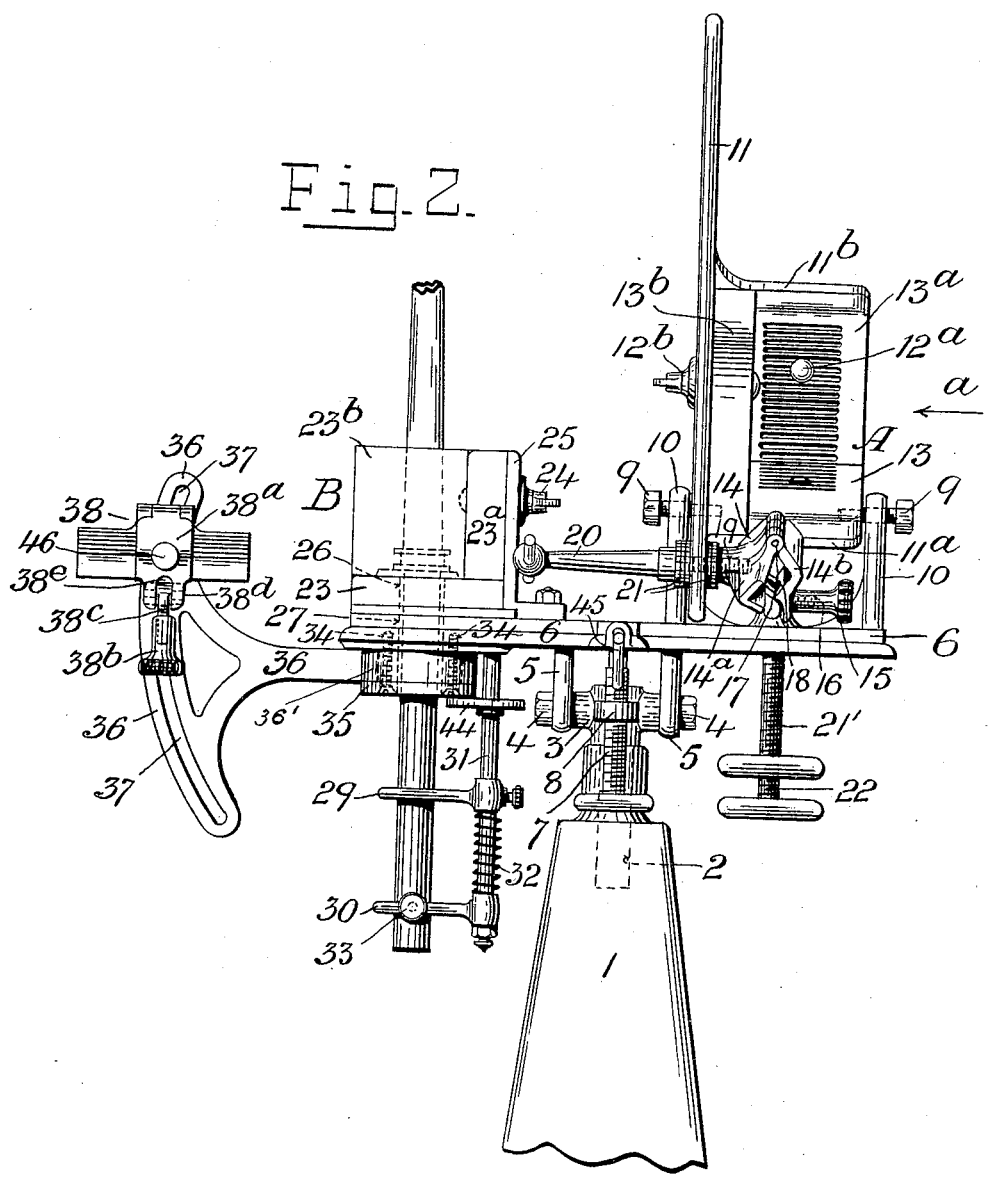

No. 607,505. Patented July 19, 1898.
D. CROWTHER.
MACHINE EMPLOYED IN BRAZING.
(Application filed Dec. 20, 1897.)
(No Model.) 3 Sheets—Sheet 3.
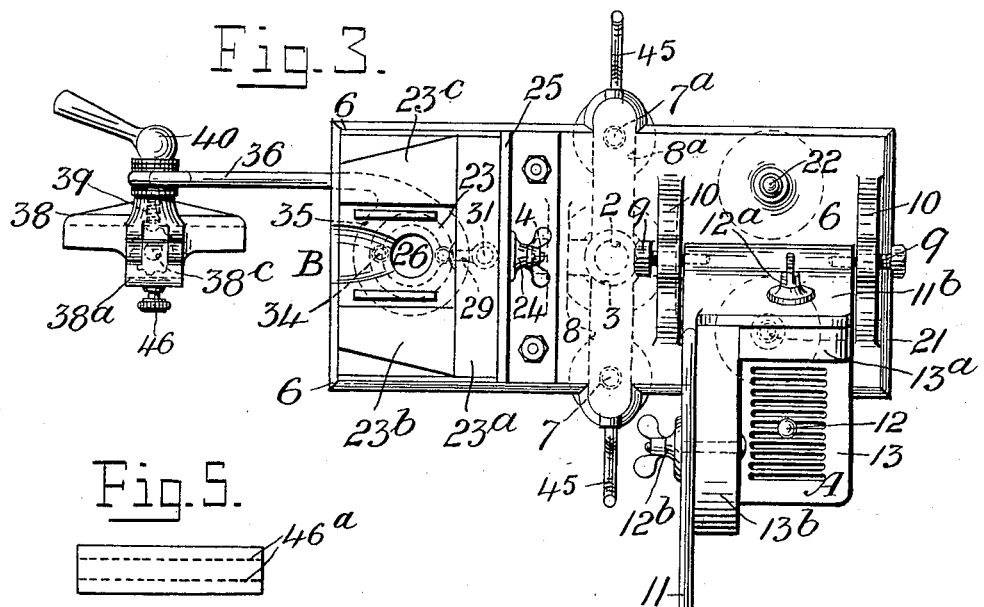
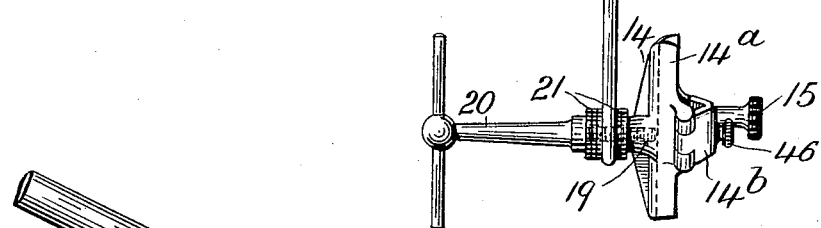
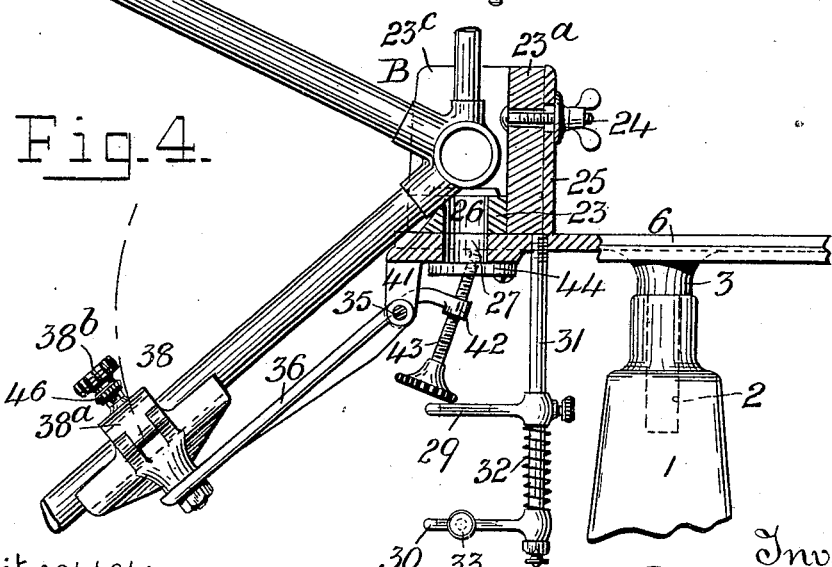
Witnesses:
Inventor:
David Crowther
by Herbert W. T. Jenner.
Attor.

UNITED STATES PATENT OFFICE.

DAVID CROWTHER, OF HUDDERSFIELD, ENGLAND.

MACHINE EMPLOYED IN BRAZING.

SPECIFICATION forming part of Letters Patent No. 607,505, dated July 19, 1898.

Application filed December 20, 1897. Serial No. 662,560. (No model.)

*To all whom it may concern:*

Be it known that I, DAVID CROWTHER, a subject of the Queen of Great Britain, residing at Milnsbridge, Huddersfield, in the county of York, England, have invented certain new and useful Improvements in Machines to be Employed in Brazing; and I do hereby declare the following to be a full, clear, and exact description of the invention, such as will enable others skilled in the art to which it appertains to make and use the same.

This invention relates to the method of and apparatus to be employed in brazing or soldering the joints of cycle frames or fittings and similar metallic objects required to be brazed together.

The object of my invention is to provide an efficient and compact machine for holding the parts to be brazed together and adjusting them to any angle required to bring, in succession, two or more joints to a vertical position on a hearth constructed to concentrate the heat thereon, the said machine being especially intended for use in conjunction with brazing material in a solid, composite, or combined form embodied in an application for United States Patent filed December 20, 1897, Serial No. 662,559, as distinguished from the ordinary powdered, loose, or fused spelter, and which facilitates and simplifies the process of brazing or soldering and reduces the risk of overheating and oxidizing the metals.

To the aforesaid purpose my invention consists in the novel and peculiar arrangement and construction of the several parts of the machine, all as hereinafter fully described.

In the accompanying drawings, illustrating my invention, Figure 1 is an end elevation of my improved brazing or soldering machine, looking in the direction of arrow $a$, Fig. 2. Fig. 2 is a side elevation of the machine, looking in the direction of arrow $b$, Fig. 1. Fig. 3 is a plan view of Fig. 2. Fig. 4 is a similar side elevation to Fig. 2, showing a modification of the hinged adjusting-arm, the right-hand end of the machine being broken off. Fig. 5 is an elevation of the construction of fire-brick employed.

In the drawings like numbers of reference designate corresponding parts throughout.

Referring to the drawings, 1 is a hollow pillar or standard, into the upper end of which enters a short stud or shaft 2, fitting loosely and adapted to turn freely therein, said short stud being secured to a cross-head 3, resting on the top of the pillar.

In each end of the cross-head 3 are journaled plain-ended bolts 4 4, which are screwed through brackets 5 5, cast or secured on the under side of a table 6, whereby the said table is movable from a horizontal to an angular position either on one side or the other. Screws 7 $7^a$, working through corresponding screwed openings in transverse extensions or arms 8 $8^a$ on the head 3 and abutting against opposite sides of the table 6, hold said table 6 in any position to which it is movable. The table 6 with the head 3 and parts are rotatable together on the pillar 1.

At the right-hand end of the table 6 and hinged on the plain ends of bolts 9, secured to brackets 10, cast or secured on the upper face of the table, is a frame 11, at the fulcrum end of which are cast or secured at right angles to each other side walls $11^a$ $11^b$, whereto and to the face of the frame within said walls are secured by bolts and wing-nuts 12 $12^a$ $12^b$ slabs or blocks 13 $13^a$ $13^b$ of fire-brick or like non-conducting or refractory material, which form a hearth A to receive the joints to be brazed or soldered and to concentrate the heat thereon. In the said frame 11 is a series of segmental slots $11^c$, forming arcs of circles struck from a center coincident to the angle of the hearth, so that a clamp 14 can be adjusted centrally with the angle of the hearth to any position within the limits of the slots $11^c$. The clamp 14 is of any approved construction which will enable it to engage with the fitting to be secured. The clamp preferably has a fixed jaw $14^a$ and a movable jaw $14^b$, pivoted at 17 to the fixed jaw and pressed toward it by a screw 16, which passes through a slot 18 in the movable jaw and is provided with a head 15 for turning it. The rear of the part $14^a$ of the clamp is tapped centrally to receive a screw 19, formed on the end of a handle 20. The said screw is first passed through one of the segmental slots $11^c$, the outer one being that ordinarily used, and then screwed into the clamp 14 until a shoulder or intermediate washer on said screw abuts against the rear of the frame 11 and secures the clamp to the face thereof. I place a few washers 21 on the screw 19 either at the front or rear of the frame 11, or both, and next thereto, so that if the clamp 14 requires adjustment to or from the frame 11 to hold a smaller or larger joint close to the corner of the hearth A the said washers can be removed from one side to the other of the frame to give the necessary adjustment. The handle 20 is provided for the double purpose of loosening and tightening the clamp 14 and adjusting its position on the frame and also for moving said frame bodily on its center from side to side to bring the joints to be brazed into a vertical position.

21' and 22 are screws adapted to work through screw-threaded openings in the table 6 and having hand-wheels thereon for actuating the same, said screws being employed to support the frame 11 in any position to which it is moved, the ends of said screws being brought into abutment with the side walls $11^a$ $11^b$ or one of them if the frame is moved past the center to one side or the other.

In full line in Fig. 1, for the sake of illustration, I have shown secured to the frame 11 the front part of a bicycle-frame as an example of how the same is arranged for brazing the bottom ball-head lug to the ball-head tube and to the bottom bone or tube of the frame at one operation. The said parts of the cycle-frame, previously fitted together ready for brazing, are placed on the frame 11 in a position to bring the bottom ball-head lug close to the corner and angle of the hearth A or meeting-point of the three bricks 13 $13^a$ $13^b$ forming said hearth, and when this has been done one of the tubes or fittings, in this case the bottom bone or tube, is secured in the clamp 14, which suffices to rigidly hold the part in position on the frame 11. The brazing material is applied before the parts are fitted together, if in the solid, composite, or combined form, and is placed around the tube just above the joints. A blowpipe is now brought to bear and the jet therefrom is directed on the vertical joint from the bottom upward, the heat applied raising the near portions of the bricks 13 $13^a$ $13^b$ to incandescence and the heat therefrom being thrown or radiated onto the rear sides of the joint, which is thus rapidly heated to the required temperature, the spelter being likewise fused and running down the tube into and filling the joint and making a perfect weld. As soon as the said joint is full the frame 11 is moved on its center to the opposite side to the extent required to bring the bottom bone or tube of the cycle-frame (which is secured in the clamp 14) to a vertical position, so that the joint between same and the bottom ball-head lug can be brazed, and this being already heated to a considerable degree by the heating of the first-named joint very little additional heat is required to complete the brazing of the second joint. As soon as this is accomplished the clamp 14 is opened and the fitting removed from the frame 11 and the joints brushed to clean off the scale before cooling. According to the above example, two joints are thus brazed at one operation and therefore in less time and with less trouble than it takes under the old process. The brazing of the joints while in a vertical position also insures an equal distribution of spelter around the joint, and consequently a more perfect and safer weld.

I have also shown in dotted lines in Fig. 1 the position of the frame 11 and rear portion of a cycle-frame to bring the joint between the top tube and the seat-pillar lug to the vertical. As in the former case, when this joint has been brazed the frame 11 is tilted over to the right until the back tube of said cycle-frame is brought to a vertical position to braze the joint between it and the seat-pillar lug. Similarly the cycle-frame can be readjusted again in the frame 11 to braze the rear and bottom tubes to the bottom bracket.

The fire-bricks are variously shaped to adapt them to the work held in proximity to them.

Other fittings to be brazed, whether belonging to cycles or otherwise, may be dealt with in the frame 11 so far as its range of adjustment and adaptation will admit; but as there are parts which cannot be dealt with in said frame I provide on the opposite end of table 6 a second hearth B, composed of fire-bricks or like refractory or non-conducting slabs 23 $23^a$ $23^b$ $23^c$, the first of which rests on the table and forms the base of the hearth, the second being secured at the rear thereof by bolt and wing-nut 24 to a plate or bracket 25, formed integral with or bolted to the table, and the last two being placed loosely on the brick 23 at each side thereof to form the sides of the hearth. The side bricks $23^b$ $23^c$ are of angular section, whereby any face thereof can be placed against the rear brick $23^a$ to give straight or angular sides to the hearth, as may be required for various joints.

The bottom brick 23 is provided with an opening 26, coinciding with an opening 27 in the table 6, through which can pass any fitting or part extending below a joint or joints to be brazed—such, for instance, as in the case of the jointing of the front forks to the fork-crown. An illustration of this is shown in Fig. 2, where the steering-column, which extends below the joints when in position for brazing, is passed through the said openings 26 and 27 to allow the fork-crown to rest on the brick 23. The said column also passes through and is maintained vertically in guides 29 30, carried on a spindle 31, the upper guide being secured to said spindle, while the lower one is adapted to be forced up same against the resistance of a confined spiral spring 32.

To hold the fork-crown (or any other fitting having a depending part) firmly against the brick 23, the steering-column is secured by a screw 33 to the guide 30, which is forced upward as much as may be necessary, so that the pressure of the spring will act thereon to hold down the tube.

Under the table 6 is secured by screws 34 a flanged bracket or trunnion 35, having a central opening corresponding to and linable with the openings 26 and 27, said bracket forming the bearing on which is pivoted and supported an arm 36, having a segmental slot 37 formed therein for affording adjustment to a clamp 38, provided with a hinged jaw 38$^a$, adapted to be secured thereto by a hand-nut 38$^b$ on a screw 38$^c$, hinged to the clamp at 38$^d$, and which registers in a slot 38$^e$ in said hinged jaw, the clamp being secured to the arm 36 by screw 39 on the end of a handle 40, Fig. 3. The arm 36 is movable in a horizontal plane because its hub 36' is pivoted on the flanged bracket 35, and the arm may be moved to any extent within the compass of the hearth B to adjust its position to suit that occupied by the fitting or tube to be jointed, and adjustment to any angle in a vertical plane is obtained by moving the clamp 38 up or down on the slotted arm 36. In addition to the adjustment vertically and horizontally afforded by the arm 36 the table 6 can be tilted on its center 4 to one side or the other transversely to accommodate fittings such as the rear stays of a cycle-frame when brazing a bridge-piece thereto, the said stays being at an angle to each other and requiring the base of the hearth to be brought to an angle coinciding with that of the lower stay when the bridge-piece is vertical.

A modification of the adjusting-arm 36 is shown at Fig. 4, where instead of being movable in a horizontal plane, as described, it is hinged at 35 to lugs 41, cast to the table and is movable in a vertical plane. A clamp 38 is secured permanently to the end of the said arm, and at the rear end of the arm is a projecting nut 42, through which works a screw 43, abutting against the under side of the table 6, and whose rotation in one direction or the other raises or lowers the arm to the position required, the range of its adjustment not being, however, so great as in the case of the arm shown in Figs 2 and 3.

On the spindle 31, Fig. 2, is centered a plate 44, which rests on a collar or flange on said spindle and is adapted to be turned around to close the opening 27 in the table when no fitting projects therethrough, similar to the plate 44 shown in Fig. 4.

The front edge of the brick 23 is hollowed out or made concave centrally to give clearance to any tube extending downward at a sharp angle from the joint to be brazed, as shown in Fig. 4, and ribs are also cast on said brick to keep the joint or fitting clear of the face of the brick.

Into each side of the table 6 are screwed hooks 45, whereon to hang the blowpipe when not in use.

In cases where the tube or fitting is smaller than the interior area of the clamp I provide set-screws 46, which are screwed through the hinged jaws of the clamp and against the tube to hold it firmly therein.

There being such a number and variety of fittings adapted to be brazed in the machine hereinbefore described, I have given only one or two examples to illustrate how the machine can be used; but it will be obvious that with the wide range of adjustment provided in respect to the hearths A and B, as also the different construction and arrangement of the same, no difficulty will be found in properly applying to one hearth or the other any fittings or parts which the machine will take, and that any person of ordinary intelligence can readily adjust the parts to obtain the best results.

The fire-bricks are preferably made with one ore two sheets of metal gauze or open wire-work 46$^a$, embedded at short distances apart in same, as illustrated at Fig. 5, in order to hold the brick together longer in case of the same cracking or breaking with the heat.

I claim as my invention—

1. In a brazing-machine, a table centered longitudinally on a cross-head adapted to turn on a pillar or pedestal, screws for supporting said table a frame pivoted in brackets at one end of said table and provided near the fulcrum with side walls arranged at right angles to each other, fire-bricks secured to each of said side walls and to the face of the frame, segmental slots in said frame a clamp secured to the frame by a screw extending through one of the slots whereby the clamp is adjustable to any position within the limits of said slots, a handle on said screw for turning the same to secure, loosen, and adjust the position of the clamp, and to move the frame on its center, and screws for supporting the frame in any position to which it is movable substantially as set forth.

2. In a brazing-machine, a table centered longitudinally in a revoluble cross-head screws for supporting said table, an arm hinged on the under side of the said table near one end thereof and movable about its center in a horizontal plane, a segmental slot in said arm, a clamp secured to the arm by a screw passed through the slot and by which the clamp is adjustable within the limits of said slot, a hearth on the same end of said table comprising a set of fire-bricks forming a base, and three sides of a rectangle, a central opening in the base of the hearth an opening through the table coinciding therewith guides supported under said table in line with the opening therein, one of said guides being adapted to be forced upward against a confined spiral spring, and having a set-screw thereto by which to secure any part or fitting extending through same, the said spiral spring, and a disk or cover to close the opening through the table and base of the hearth substantially as set forth.

3. In a brazing-machine, the combination of a revoluble cross-head, a table hinged longitudinally thereto, screws for supporting said table in a horizontal or angular position, a pivoted or hinged frame on said table provided with a fire-brick hearth, and with segmental slots, a clamp adjustable on said frame within the limits of the slots, means for securing said clamp to the frame, screws for supporting the frame in any position to which it is movable, a hinged arm at the opposite end of the table movable in a horizontal frame from side to side of the table, and provided with a segmental slot, a clamp adjustable on said arm within the limits of the slot and means for securing it to the arm, a hearth on the same end of the table comprising a set of fire-bricks forming a base and three sides of a rectangle, openings in the base of the hearth and the table to receive fittings projecting vertically below the joint to be brazed, guides under the table to hold said projecting fittings vertically one of said guides being movable upward against a spiral spring and provided with a set-screw to secure the fitting therein, and a disk or cover to close the opening through the table, substantially as set forth.

4. In a brazing-machine, the combination with a tilting table, means for supporting the same in a horizontal or angular position, and a rotatable cross-head on which said table is hinged, of a fire-brick hearth comprising three bricks arranged at right angles to each other, in the corner or angle of which the joint to be brazed can be placed, a pivoted frame carrying said hearth for adjusting various fittings to be brazed to a vertical position, a clamp adjustably secured to said frame in which to secure the fittings, means for supporting the pivoted frame in any position to which it is moved to bring the fitting to the vertical, a second fire-brick hearth on the opposite end of said tilting table comprising a base and three sides of a rectangle, a hinged arm movable in a horizontal plane to any extent within the compass of said hearth, a clamp secured to said arm and adjustable vertically thereon and in which the fittings can be secured in position to hold the joint to be brazed in a vertical position on the hearth, openings linable with each other in the base of the hearth and in the table, means under said table for holding any part of a fitting depending vertically below the joint to be brazed and means for holding said fitting firmly against the hearth substantially as set forth.

5. In a brazing-machine, the combination with a tilting revoluble table 6 pivoted frame 11 and means for supporting the same in the various positions to which they are adjustable of a hearth A on said frame, a hearth B on one end of the table, fire-bricks comprising said hearths made with separate layers or strips of open wirework embedded therein parallel with the faces of said bricks, a hinged arm 36 movable in a horizontal plane and means for securing fittings in position on said hearths, substantially as set forth.

In testimony whereof I affix my signature in presence of two witnesses.

DAVID CROWTHER.

Witnesses:
EDGAR MATHER,
THOMAS H. BARRON.